(12) United States Patent
Batten (10) Patent No.: US 6,576,140 B1
(45) Date of Patent: Jun. 10, 2003

(54) COMMERCIAL KITCHEN SINK DRAIN IMPROVEMENT

(75) Inventor: William C. Batten, Asheboro, NC (US)

(73) Assignee: Clearline Systems, Inc., Asheboro, NC (US)

( * ) Notice: Subject to any disclaimer, the term of this patent is extended or adjusted under 35 U.S.C. 154(b) by 11 days.

(21) Appl. No.: 09/843,301

(22) Filed: Apr. 25, 2001

(51) Int. Cl.[7] .............................. C02F 1/40; B02C 23/18
(52) U.S. Cl. ................. 210/744; 210/800; 210/105; 210/163; 210/173; 210/540; 241/20; 241/24.16; 241/46.013; 241/46.016; 241/81
(58) Field of Search ............................. 210/163, 164, 210/173, 538, 540, 800, 744, 105; 241/20, 29.1, 24.16, 24.26, 46.01, 46.013, 46.016, 81

(56) References Cited

U.S. PATENT DOCUMENTS

| | | | |
|---|---|---|---|
| 2,894,631 A | 7/1959 | Levit et al. ................. 210/152 |
| 3,210,014 A | * 10/1965 | Nauman et al. ......... 241/46.01 |
| 3,823,879 A | * 7/1974 | Johnson ................. 241/46.013 |
| 4,051,024 A | 9/1977 | Lowe et al. .................. 210/30 |
| 4,059,531 A | 11/1977 | Tardivel ..................... 210/522 |
| 4,111,806 A | 9/1978 | Wright et al. ............... 210/115 |
| 4,145,287 A | 3/1979 | Walker et al. .............. 210/104 |
| 4,235,726 A | 11/1980 | Shimko ....................... 210/523 |
| 4,268,396 A | 5/1981 | Lowe .......................... 210/670 |
| 4,462,915 A | 7/1984 | Friedman .................... 210/765 |
| 4,487,553 A | 12/1984 | Nagata ........................ 417/171 |
| 4,636,308 A | 1/1987 | Summers ................. 210/195.1 |
| 4,651,762 A | 3/1987 | Bowden ...................... 134/111 |
| 4,761,235 A | * 8/1988 | Haentjens ................... 210/540 |
| 4,816,146 A | 3/1989 | Schertler ..................... 210/104 |
| 4,848,381 A | 7/1989 | Livingston et al. ........... 134/57 |
| 4,917,311 A | 4/1990 | Yoshino et al. ............... 241/36 |
| 4,998,548 A | 3/1991 | Lagerstrand ................ 134/111 |
| 5,021,153 A | 6/1991 | Hawa ....................... 210/221.2 |
| 5,030,357 A | 7/1991 | Lowe .......................... 210/669 |
| 5,091,088 A | 2/1992 | Essop ......................... 210/536 |
| 5,116,516 A | 5/1992 | Smisson ..................... 210/747 |
| 5,127,417 A | 7/1992 | Tromblee et al. ........... 134/111 |
| 5,127,587 A | 7/1992 | Johnson |
| 5,308,000 A | * 5/1994 | Riley ..................... 241/46.013 |
| 5,335,866 A | 8/1994 | Narao ................... 241/46.013 |
| 5,360,555 A | 11/1994 | Batten ........................ 210/803 |
| 5,422,019 A | 6/1995 | Carman ...................... 210/787 |
| 5,492,619 A | * 2/1996 | Batten ........................ 210/540 |
| 5,505,861 A | 4/1996 | Hirs ............................ 210/521 |
| 5,705,055 A | * 1/1998 | Holloway, Jr. et al. ...... 210/540 |
| 5,714,069 A | * 2/1998 | Sager .......................... 210/540 |
| 5,795,478 A | 8/1998 | Hirs ............................ 210/521 |
| 5,861,098 A | * 1/1999 | Morrison .................... 210/540 |
| 5,948,258 A | 9/1999 | Daugherty .................. 210/513 |

(List continued on next page.)

OTHER PUBLICATIONS

Photocopy of Big Dipper Thermaco brochure; copyright 1998.

Penberthy, Multiview Liquid Level Meter, Information from the Intenet, copyright 2000.

Anver, Vacuum Pumps and Vacuum Generators, Information from the Internet, copyright 2000.

*Primary Examiner*—Christopher Upton
(74) *Attorney, Agent, or Firm*—MacCord Mason PLLC (57) ABSTRACT

A food disposal system for installation on a drain of a commercial kitchen sink enables segregation of oil/grease from effluent flows from the drain. A housing collects effluent flows containing water, oil/grease, and solids from the drain, and a macerating pump has an inlet connected to an opening of the housing and an outlet connected to a sanitary drain. A greasy water outlet extends to an oil/grease separator from an outlet on the housing above the macerating pump inlet, and a hot water backflush source enables hot water to flow into the housing.

33 Claims, 5 Drawing Sheets

U.S. PATENT DOCUMENTS

| | | | |
|---|---|---|---|
| 5,951,878 A | 9/1999 | Astrom | 210/791 |
| 6,007,006 A | 12/1999 | Engel et al. | 241/46.014 |
| 6,045,709 A | 4/2000 | Roberts | 210/803 |
| 6,083,384 A | 7/2000 | Al-Ali | 210/175 |
| 6,135,374 A | 10/2000 | Hansen et al. | |
| 6,168,723 B1 | 1/2001 | Moody | 210/774 |
| 6,261,446 B1 * | 7/2001 | Cornick | 210/173 |
| 6,261,462 B1 * | 7/2001 | Batten | 210/800 |
| 6,368,501 B1 * | 4/2002 | Batten | 210/540 |

* cited by examiner

COMMERCIAL KITCHEN SINK DRAIN IMPROVEMENT

BACKGROUND OF THE INVENTION

The present invention relates to improvements in facilities for maintaining drains in commercial kitchens.

In cooking environments, various items are discharged into a drain, not the least of which is grease, a by-product from cooking and washing. Grease in particular can be a source of problems, because when it cools, it can congeal and solidify, forming a solid having the capability of blocking or constricting the drain. Such grease blockage can build up over time, so it does not usually represent a discrete blockage event, but rather an accretion of congealed grease on the insides of the drains that, over time, narrows the flow path through the drain. This leads to the possibility of slow flow and, more particularly, to a possible blockage caused by a small article that would not block an unrestricted drain.

In addition, grease/water mixtures disposed directly into sewer lines burden municipal sewage systems since the grease builds up in sewer lines and on equipment in sewage treatment plants. To offset maintenance costs resulting from direct grease discharges into municipal sewers, municipal authorities assess surcharges against commercial food preparation operations that directly discharge grease/water mixtures.

Most food disposal installations in commercial kitchens involve a pre-rinse station in the dishwashing area. Dishes arriving from the dining area are first brought to the pre-rinse station where the food solids are rinsed into the pre-rinse sink and drain into the food disposal. Currently available technology does not provide for the separation of grease and oils prior to maceration by the food disposal unit. These flows frequently harbor high levels of fats (from salad dressings, butter, margarine, and fatty food scraps). As a result, food disposals are banned from commercial usage in numerous cities in the USA and around the world.

The advantages of garbage/food disposals are well known, so that the banning of such equipment brings additional problems of waste disposal, hygiene, and sanitation to commercial kitchen operations. Such operations need a solution to the problem of complying with sewer district needs while avoiding these untoward consequences.

SUMMARY OF THE INVENTION

The present invention fulfills this need in the art by providing a food disposal system for installation on a drain of a commercial kitchen sink to enable segregation of oil/grease from effluent flows from the drain. A housing collects effluent flows containing water, oil/grease, and solids from the drain. A macerating pump has an inlet connected to an opening of the housing and an outlet connected to a sanitary drain. A greasy water outlet extends to an oil/grease separator from the housing above the macerating pump inlet. A hot water backflush source enables hot water to flow into the housing. A sensor may sense the accumulated oil/grease in the housing. A controller effects the operation of the hot water backflush and macerating pump.

A screen may be interposed between the outlet and the housing. The hot water backflush may direct hot water against the screen.

The housing may be configured as a chute with the macerating pump located at a chute bottom. In such an embodiment, the outlet to the sanitary drain may include a channel extending upwardly. The greasy water outlet is typically located at the static water level.

The oil/grease separator may itself include a macerating pump to macerate solids that travel to the oil/grease separator.

In one embodiment the controller is a timed controller. A sensor may be included for sensing accumulated oil/grease in the housing, and the controller may effect the operation in response to the sensor sensing the oil/grease causing a water backup to a particular level. If the outlet to the sanitary drain includes a channel extending upwardly, the sensor may be located in the outlet to the sanitary drain above the static water level so that it senses a raised water level caused by an accumulation of oil/grease. Alternatively, the outlet to the sanitary drain may include a channel extending upwardly to define a secondary static water level with the sensor located in an upper portion of the housing below the secondary static water level so that it senses a raised water level caused by an accumulation of solids.

A cold water source may be included actuable to introduce cold water into the housing when the macerating pump is operated.

The controller may be an operator-actuable switch.

In one embodiment the greasy water outlet includes a running gas trap assembly.

The invention also provides a fitting for installation on a drain of a commercial kitchen sink to enable segregation of oil/grease from effluent flows from the drain. The fitting includes a housing for collecting effluent flows containing water, oil/grease, and solids from the drain. An opening on the housing is adapted to be connected to a macerating pump, and a greasy water outlet on the housing above the opening is adapted to be connected to an oil/grease separator. The housing also has a hot water backflush fitting adapted to be connected to a hot water source for enabling hot water to flow into the housing. A controller may be included adapted to be connected for effecting the operation of the hot water backflush and macerating pump. In a preferred embodiment the housing includes a chute with a bottom, with the opening near the chute bottom.

The invention also provides a method of segregation of oil/grease from effluent flows of a drain of a commercial kitchen sink including draining the effluent flow containing water, oil/grease, and solids from a commercial kitchen sink to a housing below the sink, allowing gravitational separation of lighter components from heavier components of the effluent flow to take place in the housing, directing lighter components of the effluent from the housing to an oil/grease separator, and periodically operating a macerating pump having an inlet connected to the housing to pump and macerate the heavier components and direct the heavier components to a sanitary drain.

The method may include maintaining a static water level at an elevation in the housing above the inlet. Directing the lighter components includes permitting gravitational flows of the lighter components from the housing at a height in the housing at the static water level. The gravitational separation of components of the effluent flow may include permitting heavy solids to travel down a chute to the inlet of the macerating pump.

The separation of lighter components from heavier components of the effluent flow may include screening solids from traveling with the lighter components. If so, the method may also include periodically directing hot water flows against a screen to loosen grease-bound solids from the screen. The hot water may be directed against the screen when a water level sensor indicates a rising water level.

Typically, the macerating pump is operated after the hot water is directed against the screen. Cold water may be introduced into the housing when the macerating pump is operated.

The macerating pump may be operated by a timer. Alternatively, the macerating pump may be triggered by a manually operated switch or a level detector.

BRIEF DESCRIPTION OF THE DRAWINGS

The invention will be better understood by a reading of the Detailed Description of the Preferred Embodiments along with a review of the drawings, in which.

DETAILED DESCRIPTION OF THE PREFERRED EMBODIMENT

The food disposal system segregates and extracts oil/grease from effluent flows containing solids prior to maceration and disposal of the solids by the disposer to a sanitary sewer. The invention's primary application is in commercial kitchen sinks, which includes virtually any kitchen sink other than a residential unit, although the invention may have applicability in residences. The apparatus of the first embodiment includes: 1) an inlet case for collecting a waste stream containing water, oil/grease, and solids from a kitchen drain; 2) a macerating pump (conventionally referred to as a garbage disposer) having an inlet connected to an opening on the bottom of the inlet case and having a solids/water outlet pipe connected to a sanitary drain; 3) a greasy water outlet pipe extending from an outlet opening on a sidewall of the inlet case near the top of the inlet case to an oil/grease separator; 4) a solids blocking screen in the entrance to the outlet pipe from the inlet case; 5) a hot water backflush system directed onto the screen; 6) a cleaning cycle sensor in the solids/water outlet pipe for sensing the level of accumulated wastes in the inlet case; and 7) a controller connected to the sensor for controlling the sequenced operation of the hot water backflush system and macerating pump.

Wastewater accumulates in the inlet case until it reaches the static water level height defined by the bottom of the gray water outlet pipe. Heavy solids sink to the bottom, and floating solids and oil/grease rise to the top surface. When a sufficient quantity of waste fills the inlet case to rise to a higher level (due to blockage of the gray water outlet by congealed oil/grease), the cleaning cycle sensor in the solids/water outlet pipe is triggered. The disposal cycle begins with activation of the hot water backflush, which cleans blockage of the screen caused by accumulated oil/grease or solids. With the screen clear, the floating oil/grease and some water is free to drain from the inlet case through the greasy water outlet. After a set period of time, the controller activates the macerating pump, which grinds any large solids and discharges the solids/water mixture remaining in the inlet case out through the solids/water outlet pipe to the sanitary sewer.

Figure 1:
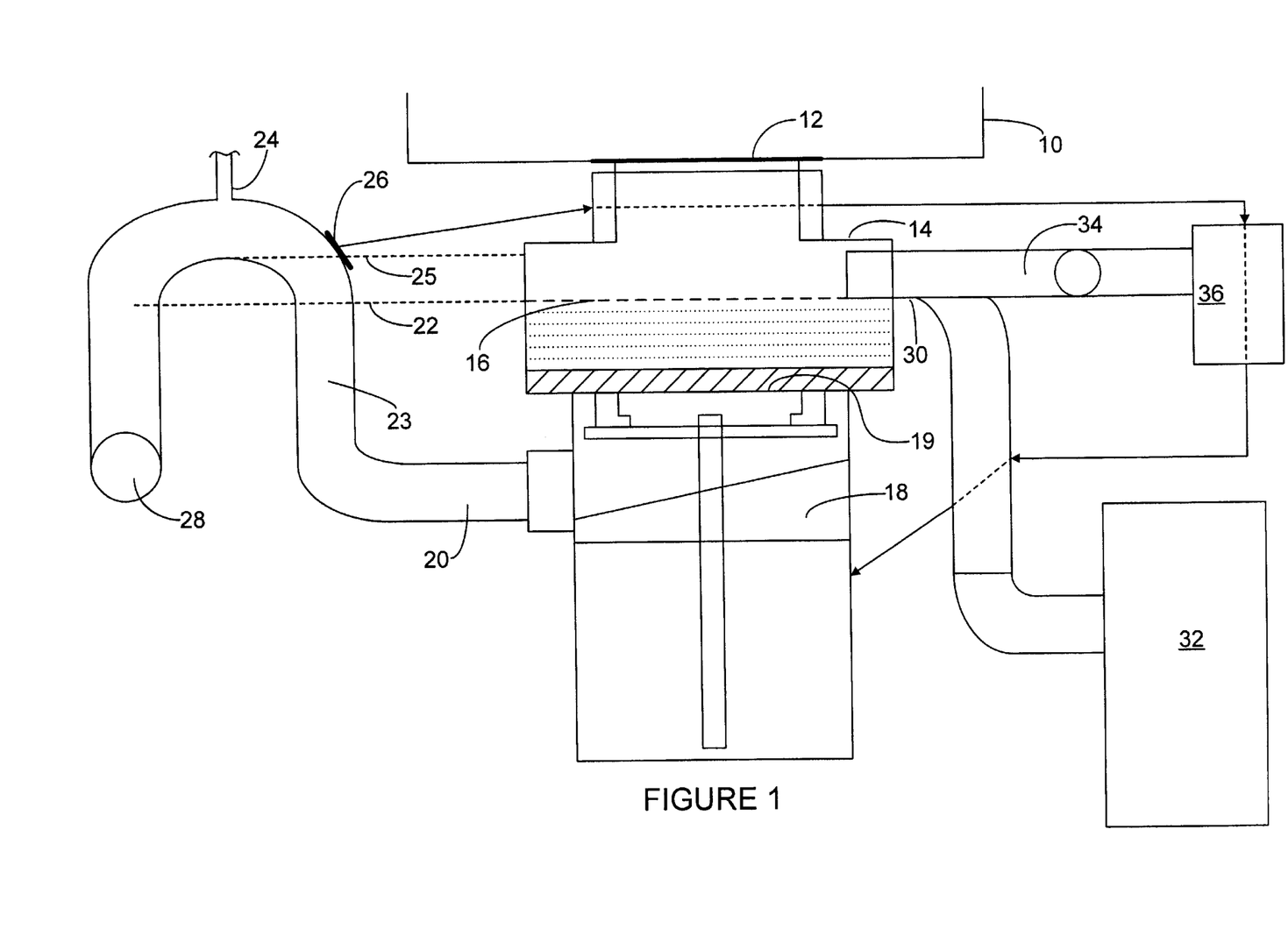
FIG. 1 is an elevational schematic view of a commercial kitchen sink equipped with apparatus according to a first embodiment of the invention.
Figure 2:
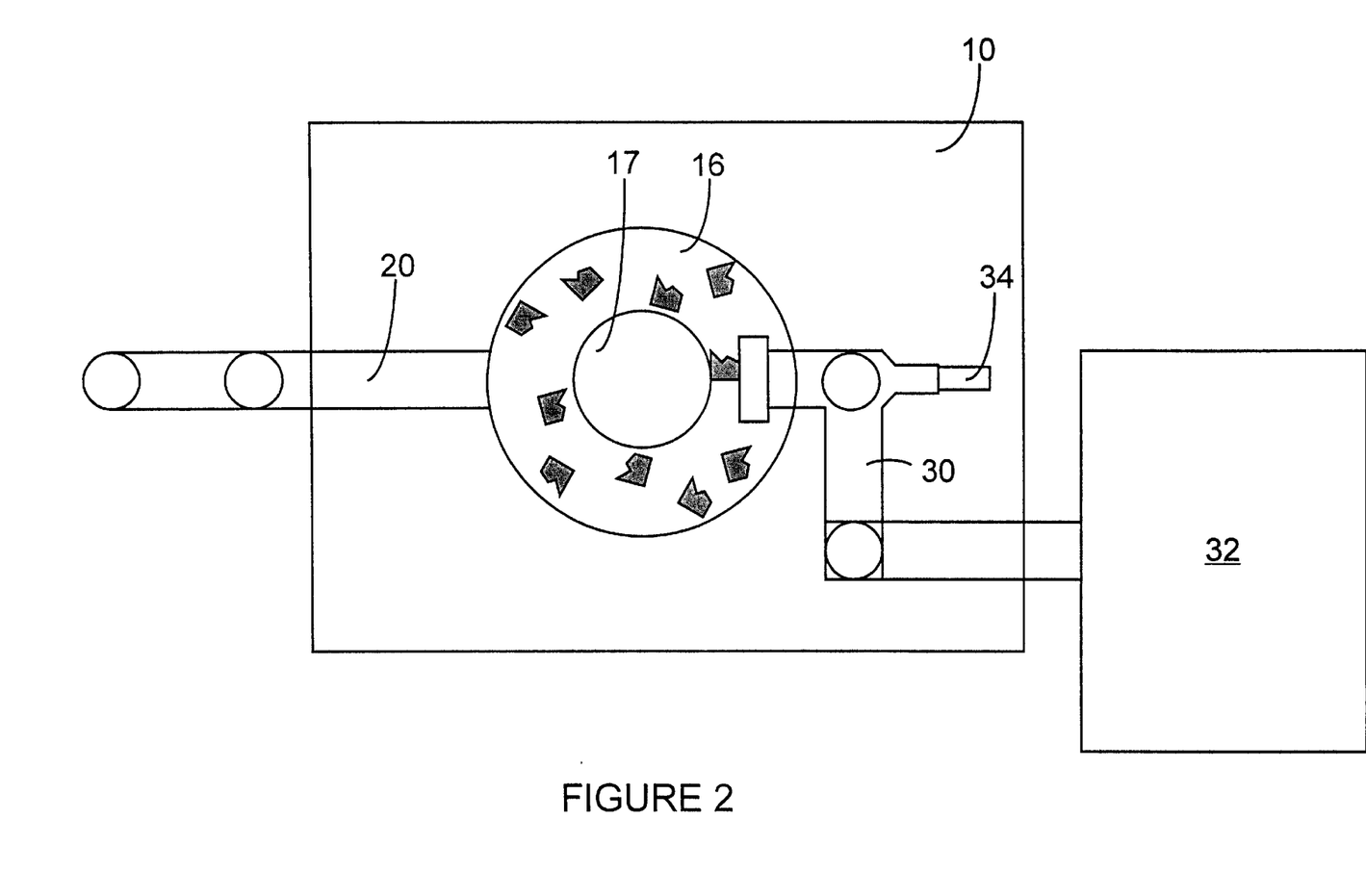
FIG. 2 is a bottom schematic view of the embodiment of FIG. 1.

As seen in FIG. 1, a commercial kitchen sink 10 has, as is conventional, a lower drain 12 through which the contents of the sink 10 discharge under the force of gravity. In the embodiment of FIG. 1, mounted on the bottom side of the sink is an inlet case or housing 14 defining a holding chamber for the effluent discharged through drain 12. A screen 16 is provided about two-thirds of the way up the housing 14 with a central hole 17, as seen in FIG. 2. The central hole permits solids and other materials to flow from the drain 12 to the bottom of the inlet case 14.

A greasy water outlet 30 is provided just above the screen 16 and leads downwardly to a grease separator 32. The grease separator 32 can be any suitable separator for separating kitchen oil and grease from water. A particularly preferred separator is a Big Dipper® separator from Thermaco, Inc. of Asheboro, N.C. Aligned with the outlet 30 is a hot water backflush port 34 controlled by a valve controller and valve 36. The controller also can have an input to control the motor of the macerating pump 18. The bottom of outlet 30 defines the normal static water level 22.

Mounted to the bottom of the housing 14 is a macerating pump 18. The macerating pump 18 can be any conventional food or waste disposer which has heretofore been known or may later be developed for these purposes. It has the function of grinding solids and pumping them along with a flow of water from an inlet 19 to an outlet 20. The outlet 20 connects through a riser pipe 23 to lead to the sanitary drain 28. The riser pipe 23 defines a secondary static water level to be at the lower-most point of the pipe's upper bend 25, which can be reached if there is a prolonged blockage to outlet 30. If desired, a vent 24 can be provided at the top of the riser pipe, and this may be needed to comply with building code requirements. A sensor 26 is provided above the static water level 22 to indicate if the water level rises above its normal static level. This thereby provides an indication of the accumulation of oil/grease on the screen in the housing.

The inlet case 14 collects heavy solids at the bottom of the casing just above the macerating pump 18, with gray water on top of that. Lighter components, such as floating solids and oil/grease, can float to the top of the gray water as the effluent has a residence time in the inlet case 14. As long as the macerating pump 18 is off, the heavy solids will remain in the inlet case 14, although the gray water passes through the heavy solids and out through the discharge pipe 20 to the sanitary drain.

In operation, as dishes are pre-rinsed in sink 10, water flushes solid food components and particles, as well as grease, from the plates and other dishes through the drain 12 into the inlet case 14. The heavy solids settle to the bottom of the inlet case, and the case accumulates gray water. Grease, oil, and light solids tend to float on the gray water to the height of the greasy water outlet 30, from which they drain to the grease separator 32 for separation of grease from the water. The separated water can then be discharged to a sanitary drain, with the grease saved for processing or other appropriate disposal. If other floating solids travel through the outlet 30 along with the grease, they can be handled in conventional fashion, such as by the use of a grease separator 30 equipped with a macerator of its own, such as is disclosed in U.S. Pat. No. 5,360,555, which issued Nov. 1, 1994 to William C. Batten and was assigned to Clearline Systems, Inc. The entire disclosure of that patent is incorporated herein by reference. Alternatively, the separator disclosed in U.S. patent application Ser. No. 09/439,542 filed Nov. 12, 1999, entitled Combination Pump and Separator, Especially For Commercial Kitchens, may be used. That application was allowed by Notice of Allowance dated Feb. 28, 2001, and the contents of that patent application are hereby incorporated herein by reference.

The presence of the screen 16 minimizes the solids inflow to the grease separator 32. However, screen 16 may also attract grease that may congeal upon the screen and, ultimately, blind the screen, preventing the grease and gray water from exiting through the greasy water outlet 30. If this is the case, the water level will build up to the point where the top of the water level in the outlet pipe 20 is above normal, i.e., progressing toward the secondary static water level 25, which is sensed by the cleaning cycle sensor 26. Upon the cleaning cycle sensor 26 sensing the rise in water level, the controller 36 opens the hot water valve to the hot water backflush port 34 to introduce hot water to the screen 16. The heat of the hot water melts the grease, thus unblinding the screen. Preferably, the screen is formulated of a wedge wire arrangement so as to minimize the chance of solids blinding, but the reverse flow of the hot water through the port 34 further flushes away any entrained or entrapped solids. The hot water can continue until the water level sensor 26 no longer senses the raised water level, indicating the freeing of the screen 16. Alternately, the hot water can continue to flow for a preset period of time.

Once the hot water has ceased, the controller 36 turns on the macerating pump 18 for a preset period of time so that the pump grinds the solids that are just above its inlet in the housing 14, macerating them and blending them with influent gray water and discharging them through the outlet 20. The operation of the pump 18 can be for a preset period of time or triggered to stop in response to a sensed condition. Having the pump operate just after the hot water flow to the screen minimizes the amount of oil/grease that will pass through the macerating pump 18 to the sanitary drain 28.

Figure 3:
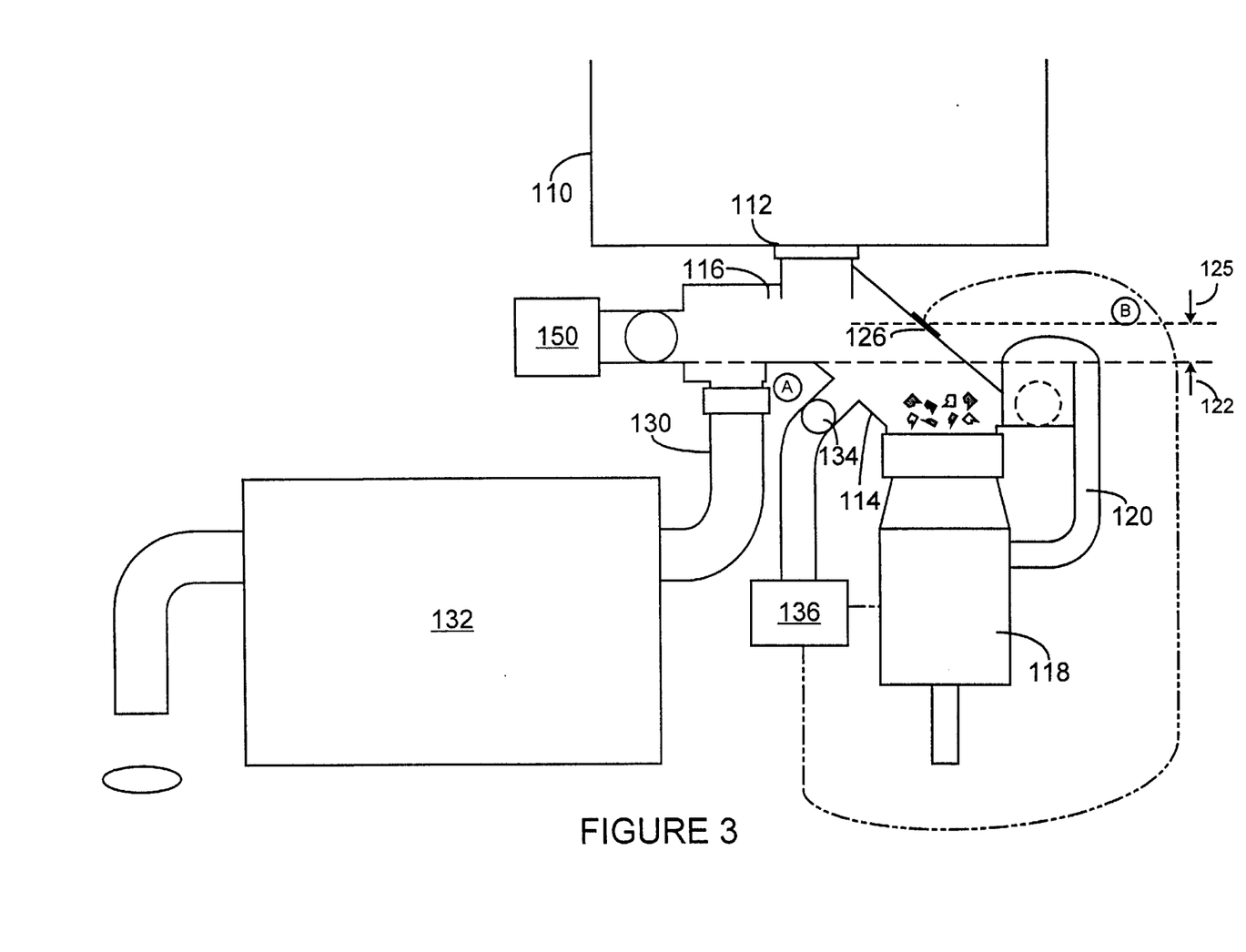
FIG. 3 is an elevational schematic view of a commercial kitchen sink equipped with apparatus according to a second embodiment of the invention.

Turning now to FIG. 3, another embodiment is disclosed. Here like parts will be referred to by similar reference numerals, augmented by 100. In FIG. 3, sink 110 drains through drain 112 into a housing 114 configured as a chute. The lower end of the chute 114 terminates in an opening to macerating pump 118 which discharges through an outlet 120. The housing 114 also leads to the greasy water outlet 130 to a separator unit 132, like separator 32 above. A screen 116 of ½" gap bars prevents large solids from passing through the outlet 130. The outlet 130 also defines the normal static water level 122. A riser configuration on outlet 120 defines a possible second static water level 125. Variations in the water above level 122 can be sensed by water level sensor 126. A hot water backflush 134 is provided in the chute to introduce hot water to the chute to help raise the temperature and maintain the grease in a flowable condition.

In operation, the water, oil/grease, and solids discharge downwardly from the sink 110 through the drain 112 into the chute 114. The chute 114 has a fairly substantial size so that the solids, which are typically heavier than water, will fall down the chute to the macerating pump 118. The oil/grease rises to the top of the chute and passes through screen 116 for discharge downwardly through the pipe 130 to the separator 132. At such time that the water level reaches a backed-up level because of solids and grease accumulation on screen 116, the sensor 126 senses such increased level and signals the controller 136 to inject hot water through the hot water backflush 134 to help liquefy any grease and frees up the screen 116. Following the hot water injection, the macerating pump 118 is operated, which grinds the solids which have accumulated at the inlet of the macerating pump and drives them toward the sanitary drain through the outlet 120. When the controller 136 actuates pump 118, it also opens a valve 150 for a cold water port to supply cold water to the macerator to provide the solids flowability through the pump 118 and discharge pipe 120. When the pump 118 is halted by the controller, the cycle can resume. Again, the macerating pump is not activated until substantially all of the oil/grease has left the chute 114.

Figure 4:
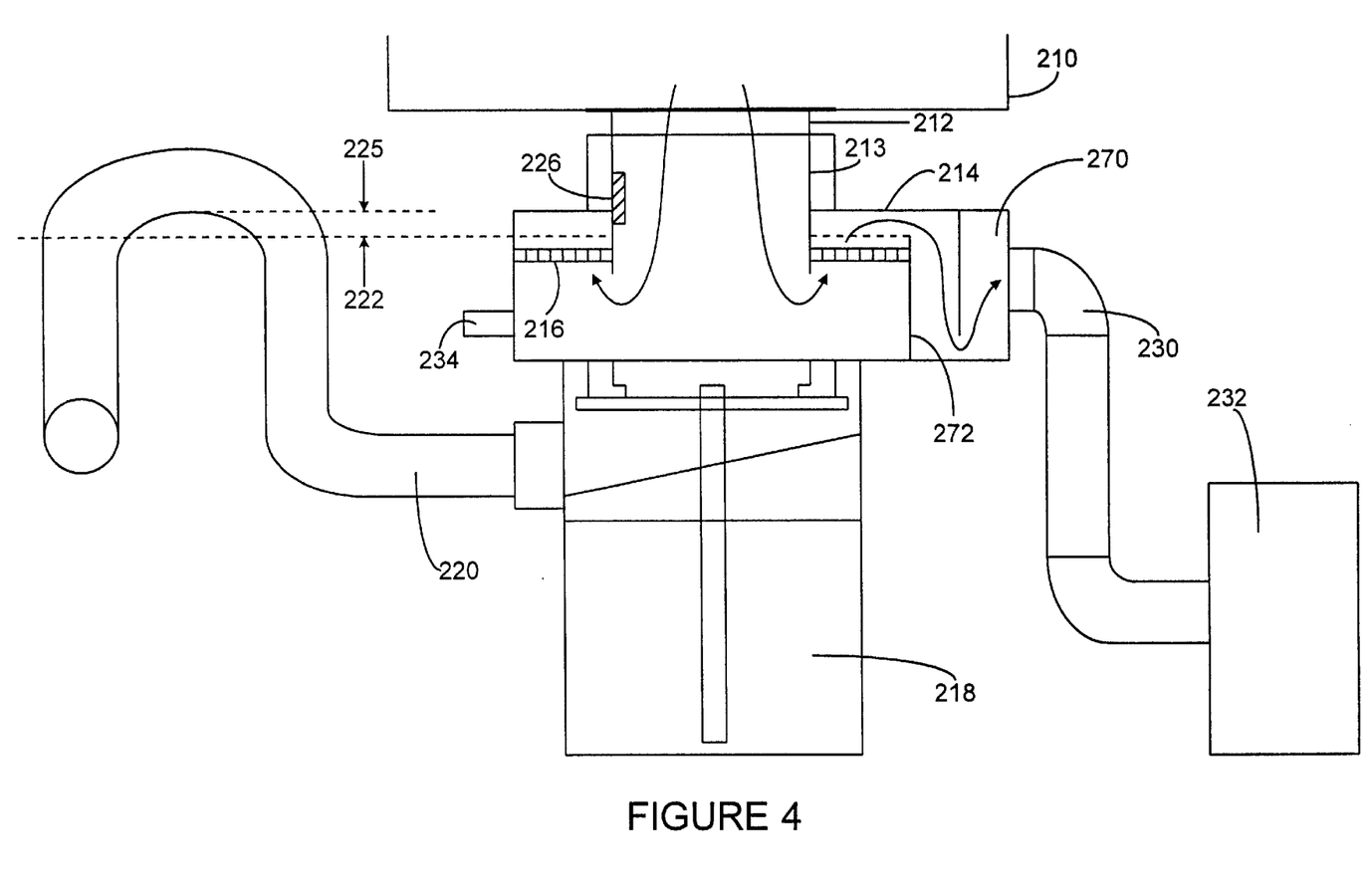
FIG. 4 is an elevational schematic view of a commercial kitchen sink equipped with apparatus according to a third embodiment of the invention.
Figure 5:
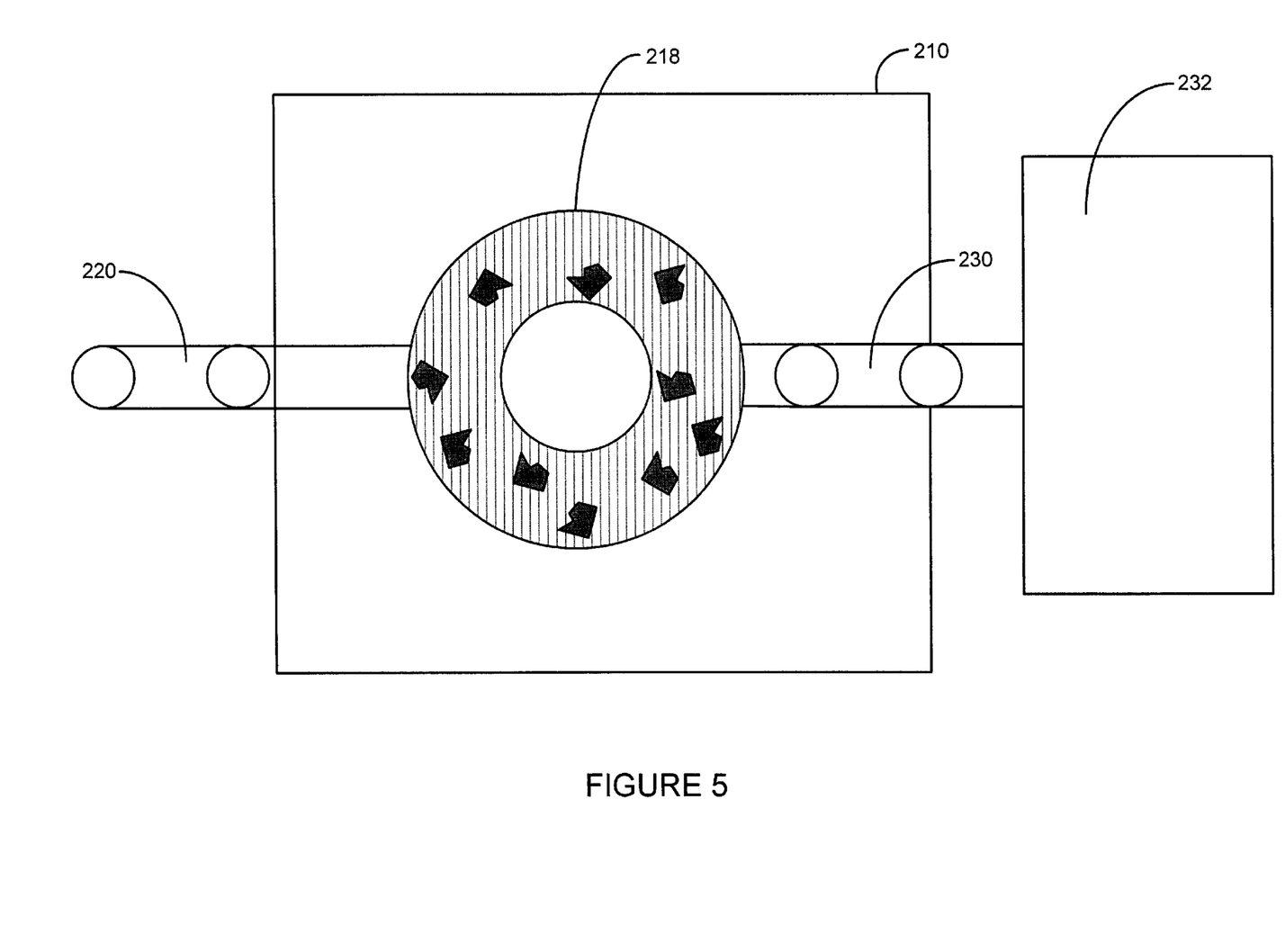
FIG. 5 is a bottom schematic view of the embodiment of FIG. 4.

FIGS. 4 and 5 show a third embodiment of the present invention. Once again, like components will be referred to by similar numbers, augmented by an additional 100. In this case, the sink 210 drains through drain 212 into a housing 214 provided with an annular screen 216. Drain 212 includes a cylindrical sleeve 213 preventing any flow above the screen 216 except for that which passes from below the screen. A running gas trap assembly 270 interposed between the housing 214 and the greasy water outlet 230 includes a weir 272 that defines the static water level 222. In the event that the screen becomes blinded so water cannot exit through the screen, the water level will build up in the outlet 220 to a new static water level 225 defined by the outlet pipe 220. The cleaning cycle sensor switch 226 detects the rising water level and opens a valve to inject water through hot water backflush port 234 into the housing 214. The hot water serves to melt grease which may have adhered to the screen 216 to permit the resumed flow of oil/grease and water through the greasy water outlet 230 to the grease separator 232. The controller, after turning off the hot water backflush port 234, then turns on the macerating pump 218 to grind and discharge through outlet 220 the solids and gray water which have accumulated in the housing 214, substantially free of oil/grease.

Although these various embodiments have been described as having a controller which actuates the hot water flow followed by actuation of the macerating pump, other control methodologies can be implemented. For example, both functions can be performed with an operator-actuated on/off switch or valve control. One or both of the functions can also be performed on the basis of a timer which can be adjustable or not, as desired.

Certain modifications and improvements will occur to those skilled in the art upon reading the foregoing description. It should be understood that all such modifications and improvements have been omitted for the sake of conciseness and readability, but are properly within the scope of the following claims.

What is claimed is:

1. A food disposal system for installation on a drain of a commercial kitchen sink to enable segregation of oil/grease from effluent flows from the drain comprising:

a housing for collecting effluent flows containing water, oil/grease, and solids from the drain, a macerating pump having an inlet connected to an opening of the housing and having an outlet connected to a sanitary drain, a greasy water outlet extending to an oil/grease separator from the housing above the macerating pump inlet, a hot water backflush source for enabling hot water to flow into the housing, a sensor for sensing an accumulation of oil/grease in the housing, and a controller for effecting the operation of the hot water backflush and macerating pump.

2. A system as claimed in claim 1 further comprising a screen interposed between the outlet and the housing.

3. A system as claimed in claim 2 wherein the hot water backflush source directs hot water against the screen.

4. A system as claimed in claim 1 wherein the housing is configured as a chute with the macerating pump located at a chute bottom, the outlet to the sanitary drain includes a channel extending upwardly from the macerating pump and the greasy water outlet is located near the upper part of the chute to define the static water level.

5. A system as claimed in claim 1 wherein the oil/grease separator includes a macerating pump to macerate solids that may travel to the oil/grease separator.

6. A system as claimed in claim 1 wherein the controller is a timed controller.

7. A system as claimed in claim 1 further comprising a sensor for sensing a level of accumulated oil/grease in the housing, and wherein the controller effects sequenced operation of the hot water backflush and macerating pump in response to the sensor sensing the oil/grease at a particular level.

8. A system as claimed in claim 7 wherein the greasy water outlet defines a static water level and the sensor is located in the outlet above the static water level so that it senses a raised water level caused by an accumulation of oil/grease.

9. A system as claimed in claim 8 wherein the outlet to the sanitary drain includes a channel extending upwardly to define a secondary static water level and the sensor is located below the secondary static water level.

10. A system as claimed in claim 1 wherein the controller is an operator-actuable switch.

11. A system as claimed in claim 1 wherein the greasy water outlet includes a running gas trap assembly.

12. A system as claimed in claim 1 further comprising a cold water source actuable to introduce cold water into the housing when the macerating pump is operated.

13. A system as claimed in claim 1 wherein the controller actuates the backflush followed by the macerating pump.

14. A system as claimed in claim 13 wherein the backflush and macerating pumps are actuated for preset times.

15. A system as claimed in claim 13 wherein the backflush continues until a sensor indicates accumulated oil/grease has diminished.

16. A system as claimed in claim 13 wherein the backflush continues until a sensor indicates accumulated oil/grease has diminished and the macerating pump is actuated for a preset time.

17. A food disposal system for installation on a drain of a commercial kitchen sink to enable segregation of oil/grease from effluent flows from the drain comprising:
 a chute having a bottom and a top for collecting effluent flows containing water, oil/grease, and solids from the drain,
 a greasy water outlet extending to an oil/grease separator from an outlet on the chute located near the upper part of the chute to define a static water level,
 a macerating pump having an inlet connected to an opening at the bottom of the chute and having an outlet connected to a sanitary drain,
 a hot water backflush source for enabling hot water to flow into the chute, and
 a single controller for effecting the operation of both the hot water backflush and macerating pump.

18. A food disposal system for installation on commercial kitchen sinks to enable segregation of oil/grease from effluent flows comprising:
 an inlet case for collecting a waste stream containing water, oil/grease, and solids from a kitchen drain,
 a macerating pump having an inlet connected to an opening on a bottom of the inlet case and having a solids/water outlet pipe connected to a sanitary drain,
 a greasy water outlet pipe extending from an outlet opening near a top of the inlet case to an oil/grease separator, a solids blocking screen in the entrance to the greasy water outlet pipe from the inlet case,
 a hot water backflush system directed onto the screen,
 a cleaning cycle sensor in the solids/water outlet pipe for sensing the level of accumulated oil/grease in the inlet case, and
 a controller connected to the sensor for effecting the operation of the hot water backflush system and macerating pump.

19. A fitting for installation on a drain of a commercial kitchen sink to enable segregation of oil/grease from effluent flows from the drain comprising:
 a housing adapted for collecting effluent flows containing water, oil/grease, and solids from the drain,
 an opening on the housing adapted to be connected to a macerating pump,
 a greasy water outlet on the housing above the opening adapted to be connected to an oil/grease separator, and
 a hot water backflush fitting adapted to be connected to a hot water source separate from the drain for enabling hot water to flow into the housing.

20. A fitting as claimed in claim 19 wherein the housing includes a chute with a bottom, with the opening near the chute bottom.

21. A method of segregation of oil/grease from effluent flows of a drain of a commercial kitchen sink comprising:
 draining the effluent flow containing water, oil/grease, and solids from a commercial kitchen sink to a housing mounted to and below the sink,
 allowing separation of oil/grease from heavier components of the effluent flow to take place in the housing,
 directing segregated oil/grease and water out of the housing through piping to an oil/grease separator, and
 periodically operating a macerating pump suspended from the said housing and having an inlet connected to the housing to macerate and pump the heavier components and direct the heavier components to a sanitary drain.

22. A method as claimed in claim 21 further comprising maintaining a static water level at an elevation in the housing above the inlet and wherein directing the oil/grease and water includes permitting gravitational flow of the oil/grease and water from the housing at the static water level.

23. A method as claimed in claim 22 wherein the gravitational flow of the oil/grease and water is from a height in the housing below a secondary static water level.

24. A method as claimed in claim 21 wherein the gravitational separation of components of the effluent flow includes permitting heavy solids to travel down a chute to the inlet of the macerating pump.

25. A method as claimed in claim 21 wherein allowing separation of oil/grease from heavier components of the effluent flow includes screening solids from traveling with the oil/grease.

26. A method as claimed in claim 25 further comprising periodically directing hot water flows against a screen to loosen grease from the screen.

27. A method as claimed in claim 26 wherein the hot water is directed against the screen when a water level sensor indicates a rising water level.

28. A method as claimed in claim 27 wherein the macerating pump is operated after the hot water is directed against the screen.

29. A method as claimed in claim 21 further comprising introducing cold water into the housing when the macerating pump is operated.

30. A method as claimed in claim 21 wherein the macerating pump is operated for a preset interval.

31. A method as claimed in claim 21 further comprising periodically introducing hot water into the housing to maintain oil/grease in a flowable state.

32. A method of segregation of oil/grease from an effluent flow of a drain of a commercial kitchen sink comprising:

draining the effluent flow containing water, oil/grease, and solids from a commercial kitchen sink to a chute mounted to and below the sink, maintaining a static water level in the chute at an elevation above an inlet to a macerating pump, allowing gravitational separation of oil/grease from heavier components of the effluent flow to take place in the chute, including permitting heavy solids to travel down the chute to the inlet of a macerating pump, periodically introducing hot water into the chute to maintain grease in the effluent in a flowable state, directing oil/grease in the effluent from an upper elevation of the chute to an oil/grease separator, and periodically operating the macerating pump suspended from said housing and introducing cold water into the housing to pump and macerate the heavier components and direct the heavier components to a sanitary drain.

33. A food disposal system for installation on a drain of a commercial kitchen sink to enable segregation of oil/grease from effluent flows from the drain comprising:

a housing adapted to mount to a drain on an underside of a sink for collecting effluent flows containing water, oil/grease, and solids from the drain, a macerating pump having an inlet connected to an opening of the housing and having an outlet connected to a sanitary drain, a greasy water outlet extending to an oil/grease separator from the housing above the macerating pump inlet to enable oil/grease and water to exit the housing, means for maintaining the flow of oil/grease and water through the greasy water outlet, and means for effecting the operation of the macerating pump.

\* \* \* \* \*